(12) United States Patent
Poillot et al.

(10) Patent No.: US 9,662,965 B2
(45) Date of Patent: May 30, 2017

(54) SYSTEM FOR LOCKING / UNLOCKING AN OBJECT UNDER A STRUCTURE HAVING A HOOK FOR DRAWING AND SUPPORTING SAME

(71) Applicant: RENAULT s.a.s., Boulogne-billancourt (FR)

(72) Inventors: Jacques Poillot, Villepreux (FR); Gilles Mulato, Chatillon (FR); Stephane Trentin, Viry-Chatillon (FR); Bruno Escande, Septeuil (FR)

(73) Assignee: RENAULT s.a.s., Boulogne-billancout (FR)

( * ) Notice: Subject to any disclaimer, the term of this patent is extended or adjusted under 35 U.S.C. 154(b) by 145 days.

(21) Appl. No.: 14/385,309

(22) PCT Filed: Mar. 14, 2013

(86) PCT No.: PCT/FR2013/050532
§ 371 (c)(1),
(2) Date: Sep. 15, 2014

(87) PCT Pub. No.: WO2013/136017
PCT Pub. Date: Sep. 19, 2013

(65) Prior Publication Data
US 2015/0063897 A1     Mar. 5, 2015

(30) Foreign Application Priority Data

Mar. 15, 2012   (FR) ..................... 12 52323

(51) Int. Cl.
*B60K 1/04*  (2006.01)
*H01M 2/10* (2006.01)
*B60S 5/06*  (2006.01)

(52) U.S. Cl.
CPC  *B60K 1/04* (2013.01); *B60S 5/06* (2013.01); *H01M 2/1083* (2013.01);
(Continued)

(58) Field of Classification Search
CPC ............. H01M 2/1016; H01M 2/1044; H01M 2/1027; H01M 2/1083; H01M 2220/20;
(Continued)

(56) References Cited

U.S. PATENT DOCUMENTS 8,006,793 B2 *   8/2011  Heichal .................... B60K 1/04
                                                              180/65.1

(Continued)

FOREIGN PATENT DOCUMENTS

FR   2 943 970 A3   10/2010
FR   2 946 571 A1   12/2010

OTHER PUBLICATIONS

International Search Report issued Jun. 3, 2013 in PCT/FR2013/050532 (with English Translation).

*Primary Examiner* — Joshua J Michener
*Assistant Examiner* — Matthew Gitlin
(74) *Attorney, Agent, or Firm* — Oblon, McClelland, Maier & Neustadt, L.L.P.

(57) ABSTRACT

A system is provided for locking and/or unlocking an object, such as a power battery of a drive engine of an electric or hybrid motor vehicle, under a structure such as a chassis of the vehicle, including a plurality of locks ensuring the attachment of the object under the structure. The locks are secured to the object and/or structure and each include a hook configured for drawing the object to the structure by compressing an elastically deformable member inserted between the object and the structure and for supporting the (Continued)

object relative to the structure at the end of the approximation travel, as well as a transmission device driving the hook during the drawing travel and configured such as to be actuated by an actuation tool that is separate from the structure and the object.

14 Claims, 4 Drawing Sheets

(52) U.S. Cl.
CPC .............. *B60K 2001/0438* (2013.01); *B60K 2001/0472* (2013.01); *Y02T 90/124* (2013.01); *Y10T 403/1674* (2015.01)

(58) Field of Classification Search
CPC ............ B60K 1/04; B60K 2001/0438; B60K 2001/0472; B60L 11/1822; B60R 16/04; B60R 11/00; Y10T 403/59; Y10T 403/591; Y10T 403/593; Y10T 403/595; B60S 5/06
See application file for complete search history.

(56) References Cited

U.S. PATENT DOCUMENTS

| | | | | |
|---|---|---|---|---|
| 8,164,302 B2* | 4/2012 | Capizzo | ............... | B60K 15/063 104/34 |
| 9,216,718 B2* | 12/2015 | Ojima | ....................... | B60S 5/06 |
| 2009/0314382 A1* | 12/2009 | Capizzo | ............... | B60K 15/063 141/2 |
| 2011/0223459 A1* | 9/2011 | Heichal | .................... | B60K 1/04 429/100 |
| 2011/0297470 A1* | 12/2011 | Heichal | .................... | B60K 1/04 180/68.5 |
| 2012/0009804 A1* | 1/2012 | Heichal | .................... | B60K 1/04 439/34 |
| 2012/0111654 A1* | 5/2012 | Origuchi | .................. | B60K 1/04 180/68.5 |
| 2012/0251281 A1* | 10/2012 | Mulato | ............... | B60L 11/1822 414/589 |
| 2015/0151624 A1* | 6/2015 | Yamada | .................... | B60K 1/04 180/68.5 |

* cited by examiner

SYSTEM FOR LOCKING / UNLOCKING AN OBJECT UNDER A STRUCTURE HAVING A HOOK FOR DRAWING AND SUPPORTING SAME

TECHNICAL FIELD OF THE INVENTION

The invention relates to a system for locking and/or unlocking an object, such as a power battery of a drive engine of an electric or hybrid motor vehicle, under a structure such as a chassis of the vehicle, the system comprising a plurality of locks ensuring the fixing of the object under the structure.

The invention also relates to a device for mounting and/or dismounting the object under the structure involving such a locking and/or unlocking system and a plurality of actuation tools that are separate from the structure and the object in order to actuate the locks. The invention also relates to a method for dismounting and a method for mounting the object under the structure.

PRIOR ART

Some motor vehicles, such as electric or hybrid vehicles, comprise a container of energy, for powering an electric drive engine, of the electric power battery type. In the following description, the term "battery" will be used for reasons of simplification to denote in the broad sense any container of electrical power for powering an electric drive engine of a vehicle. It may be beneficial to exchange this battery, when the energy level thereof is low, for a new, charged battery. This can be performed at an exchange station, for example a station similar to a service station for filling tanks associated with heat engines.

A method for mounting and dismounting a battery on a vehicle that is at least partially electric is known from document US2011/223459. A number of locking units are mounted on the vehicle, can be controlled separately, and each comprise a fixing hook designed to be coupled to or uncoupled from the battery. The method comprises an actuation of each of the locking units in order to pivot the respective hook so as to engage with or disengage from the battery. The method comprises the step of measuring a position of the hook of each of the locking units in order to individually control each of the locking units as a function of the position of the hook thereof so as to synchronize the positions of all the hooks. A major disadvantage of this solution is the absence of leveling of the vehicle, which makes it necessary to install in the vehicle a complex actuation mechanism (at least one motor and a number of transmission shafts) in order to control the movements of the hooks and to release the battery autonomously. The cost of this solution is very high, often prohibitive, and not recoverable for the client. This complexity makes the solution unreliable and means that the functioning of said solution is not very robust.

An additional difficulty for the implementation of such a concept of battery exchange lies in the fact that there are a multitude of motor vehicles that may comprise batteries of different types, fixed differently on the motor vehicle. It is not economically viable to multiply the systems for mounting and dismounting these different types of batteries or to put in place a manual solution due to the cost thereof and the weight of the batteries. There is thus a need for a mounting/dismounting solution that is universal and that can be standardized.

OBJECT OF THE INVENTION

In order to make possible a simple development of battery exchange solutions, it is necessary to make the functioning of these solutions reliable, robust, flexible and universal, whilst limiting the cost thereof.

The object of the present invention is to provide a mounting and/or dismounting solution making it possible to overcome the previously mentioned problems. In particular, the invention proposes a solution that is simple, reliable and robust, flexible and universal, whilst also being economical.

A first aspect of the invention relates to a system for locking and/or unlocking an object, such as a power battery of a drive engine of an electric or hybrid motor vehicle, under a structure such as a chassis of the vehicle, the system comprising a plurality of locks ensuring the fixing of the object under the structure, the locks being secured to the object and/or the structure and each comprising on the one hand a hook configured to draw the object in the direction of the structure by compressing a resiliently deformable means inserted between the object and the structure and to support the object relative to the structure at the end of the drawing travel, and on the other hand a transmission device driving the hook during the drawing travel and configured to be actuated by an actuation tool that is separate from the structure and the object.

The hook can be configured so as to vary between a locking configuration supporting the object under the structure and an unlocking configuration releasing the object relative to the structure, and so as to exert a drawing force of the object relative to the structure when passing into the locking configuration so as to implement said drawing over the drawing travel, the drawing force progressively deforming the resiliently deformable means over all or part of the drawing travel and the resiliently deformable means exerting a return force equal to and opposite the drawing force.

Each lock may comprise a security mechanism varying between a blocking configuration in which the passing of the lock from one configuration to the other is inhibited and an unblocking configuration in which the passing of the lock from one configuration to the other is permitted.

The transmission device may comprise a worm screw and a pinion engaged with the worm screw, the hook being formed integrally with the pinion.

The worm screw may comprise a head accessible from a side opposite the structure, under the lock, by screwing and/or unscrewing elements belonging to the actuation tool.

The security mechanism may comprise blocking elements configured so as to prevent an accidental rotation of the worm screw.

The system may comprise at least three locks, each lock comprising bearing elements intended to cooperate by contact with bearing elements belonging to the actuation tool so as to level the structure about a longitudinal axis of the structure and/or about a transverse axis of the structure and possibly to lift the structure along a vertical axis of the structure to an independent height of the structure.

Each lock can cooperate with hooking elements secured to the object, in particular at a battery support secured to the drive battery, and configured so as to cooperate with the hook of the lock in a manner allowing the application by the hook on the hooking elements of the drawing force of the object in the direction of the structure and the support of the object by the hook at the end of the drawing travel.

A second aspect of the invention relates to a device for mounting and/or dismounting an object, such as a power battery of a drive engine of an electric or hybrid motor vehicle, under a structure such as a chassis of the vehicle, the device comprising such a locking and/or unlocking system and a plurality of actuation tools that are separate from the structure and the object, each actuation tool being configured to actuate the transmission device of a given lock of the system in order to drive the hook thereof so as to draw the object in the direction of the structure by compressing a resiliently deformable means inserted between the object and the structure and to support the object relative to the structure at the end of the drawing travel.

Each actuation tool may comprise elements selected from the following:
- elements for screwing and/or unscrewing the worm screw belonging to the transmission device of the lock,
- bearing elements intended to cooperate by contact with bearing elements secured to the lock for the leveling and possibly the lifting of the structure,
- elements for unblocking the security mechanism of the lock,
- elements for aligning the actuation tool relative to the object along the longitudinal axis and the transverse axis of the structure.

A third aspect of the invention relates to a method for mounting an object, such as a power battery of a drive engine of an electric or hybrid motor vehicle, under a structure such as a chassis of the vehicle, comprising the use of such a locking and/or unlocking system and/or of such a mounting and/or dismounting device.

A fourth aspect of the invention relates to a method for dismounting an object, such as a power battery of a drive engine of an electric or hybrid motor vehicle, under a structure such as a chassis of the vehicle, comprising the use of such a locking and/or unlocking system and/or of such a mounting and/or dismounting device.

BRIEF DESCRIPTION OF THE DRAWINGS

Further advantages and features will become clearer from the following description of specific embodiments of the invention, given by way of non-limiting example and shown in the accompanying drawings, in which.

DESCRIPTION OF PREFERRED
EMBODIMENTS OF THE INVENTION

The invention generally relates to the field of mounting and/or dismounting of an object under a structure. The principles of the invention will be described with reference to a specific non-limiting application in which the object is a power battery 10 of a drive engine of an electric or hybrid motor vehicle and in which the structure is a chassis 11 or a vehicle body. However, the invention can be used in any other field where an object has to be mounted and/or dismounted under a structure.

In this specific application in which the structure is a chassis or a vehicle body, the description is provided with reference to a coordinate system (X, Y, Z) associated conventionally with a motor vehicle, in which the axis X is the front-rear longitudinal direction of the vehicle directed toward the rear, the axis Y is the right-left transverse direction, which is horizontal and perpendicular to X, directed toward the right, and the axis Z is the vertical direction directed upwardly.

Hereinafter, a solution for solving the problems of the prior art and implementing a device for mounting and/or dismounting the object (here the power battery 10) under the structure (here the chassis 11 of the vehicle) will be described. This mounting/dismounting device basically comprises a locking and/or unlocking system, which will be described in greater detail, and a plurality of actuation tools 12 that are separate from the structure and the object and are intended to cooperate with the locking and/or unlocking system, in particular so as to control selectively an action of locking or unlocking of the object under the structure.

Figure 1:
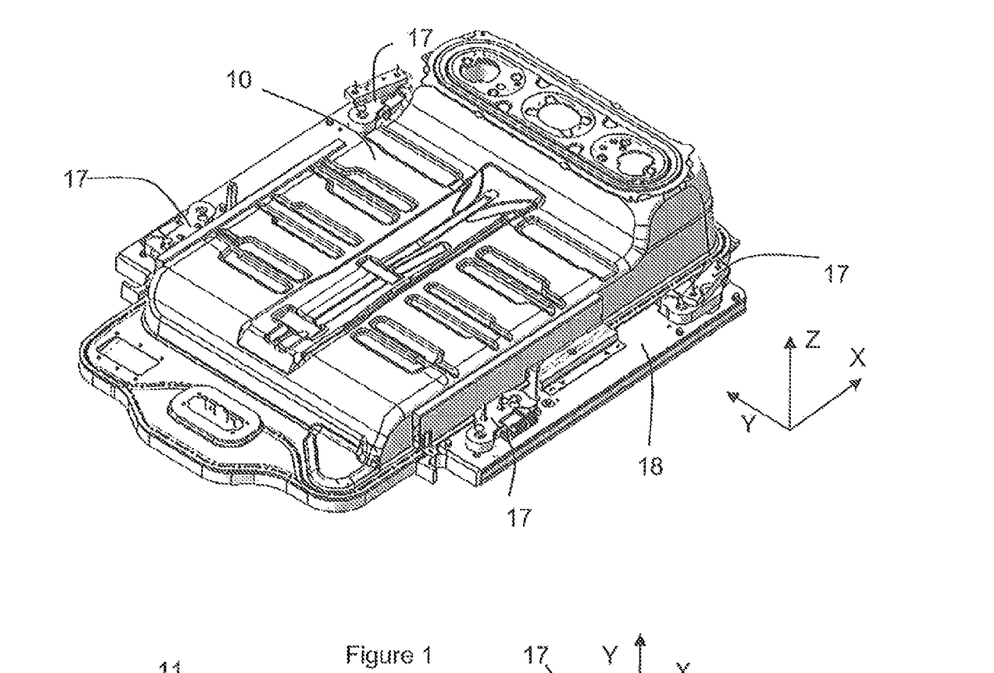
FIG. 1 is a perspective view of a battery and locks of an exemplary locking/unlocking system according to the invention.
Figure 2:
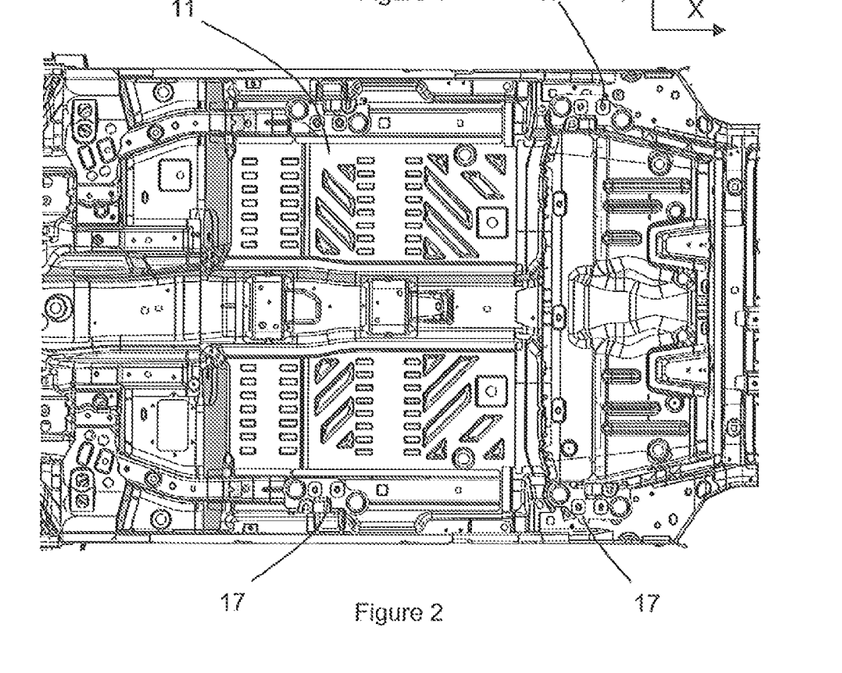
FIG. 2 is a view from below of a vehicle chassis.
Figure 3:
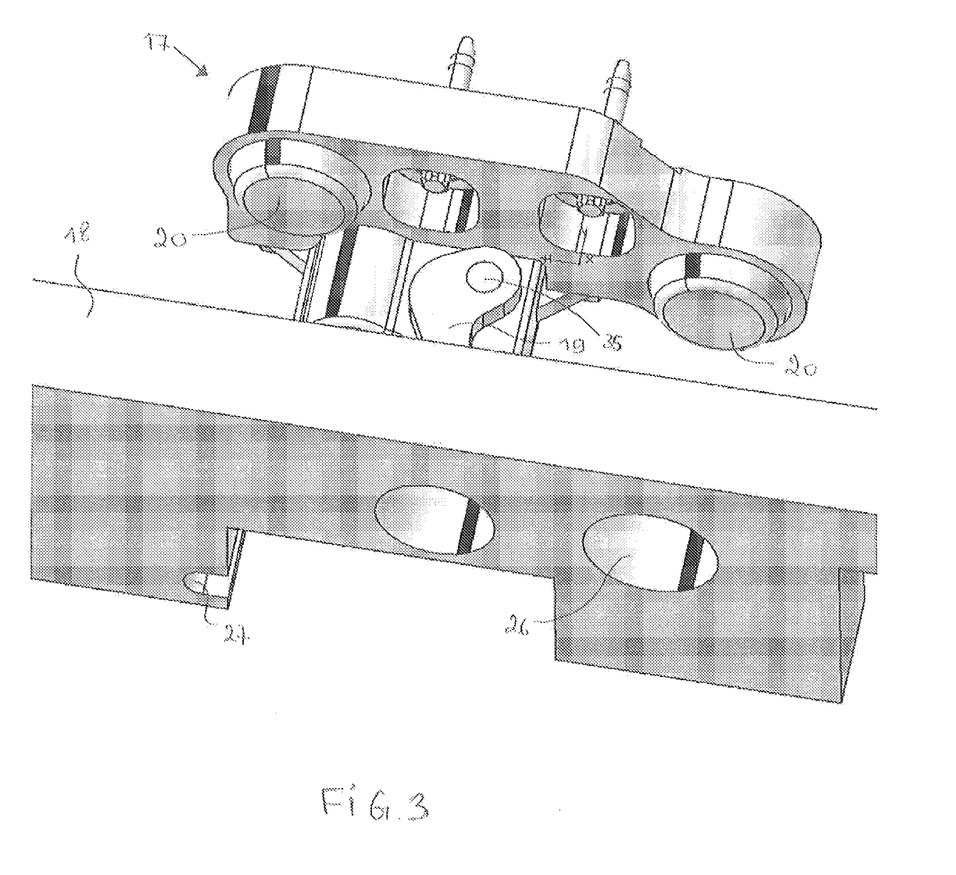
FIGS. 3 and 4 are perspective views, from the front and rear respectively, of the part, fixed to the chassis, of a lock used in FIG. 1, and FIGS. 5 and 6 are longitudinal-vertical views of an exemplary mounting/dismounting device according to the invention, in an unlocking configuration and in a locking configuration of the hooks respectively.
Figure 4:
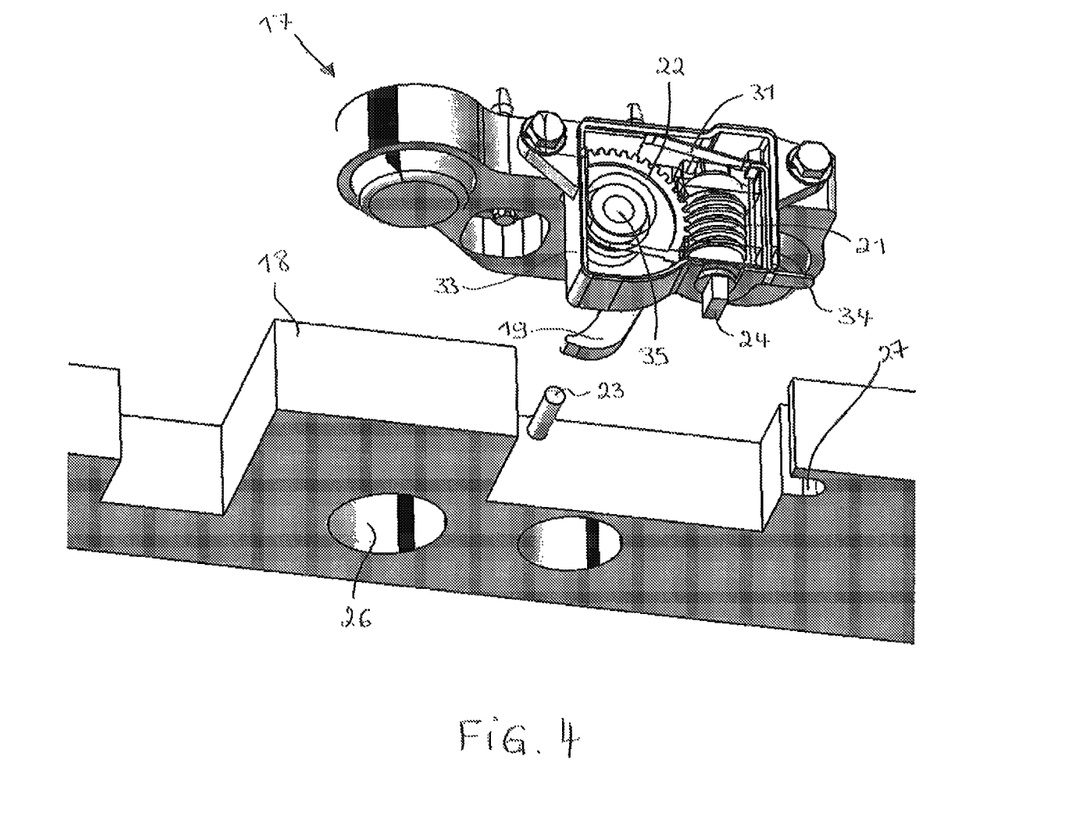

The system for locking and/or unlocking the object (here the power battery 10) under the structure (here the chassis 11 of the vehicle) comprises a plurality of fixing locks 17 ensuring the fixing of the object under the structure. The locks 17 are secured to the structure in the illustrated example, but they may be secured to the object alternatively or in combination. FIGS. 3 and 4 in particular illustrate one of these locks 17. FIG. 1 shows on the one hand the object, which comprises the battery 10 and a battery support 18 (also known as a rail) secured to the battery 10, and on the other hand the locks 17 (the structure therefore is not shown in FIG. 1, but only in FIG. 2).

Figure 5:
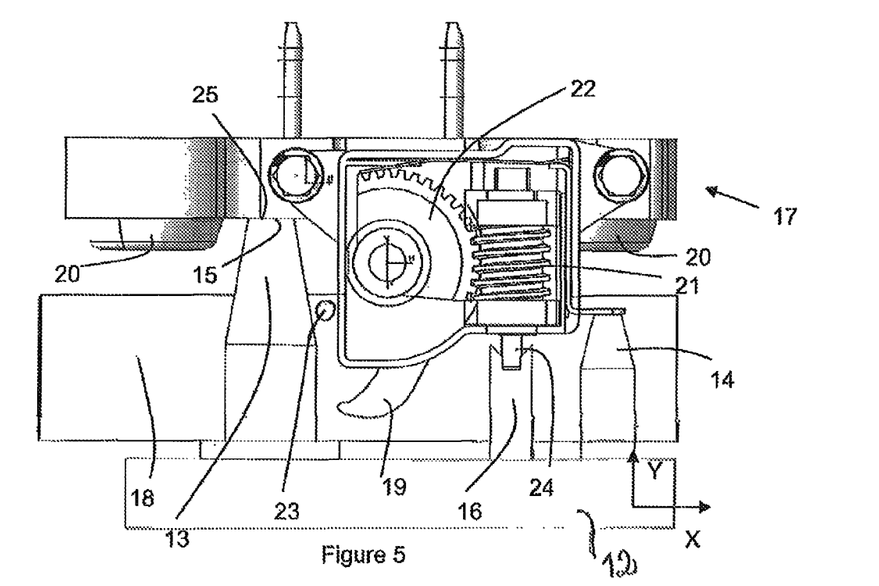
Figure 6:
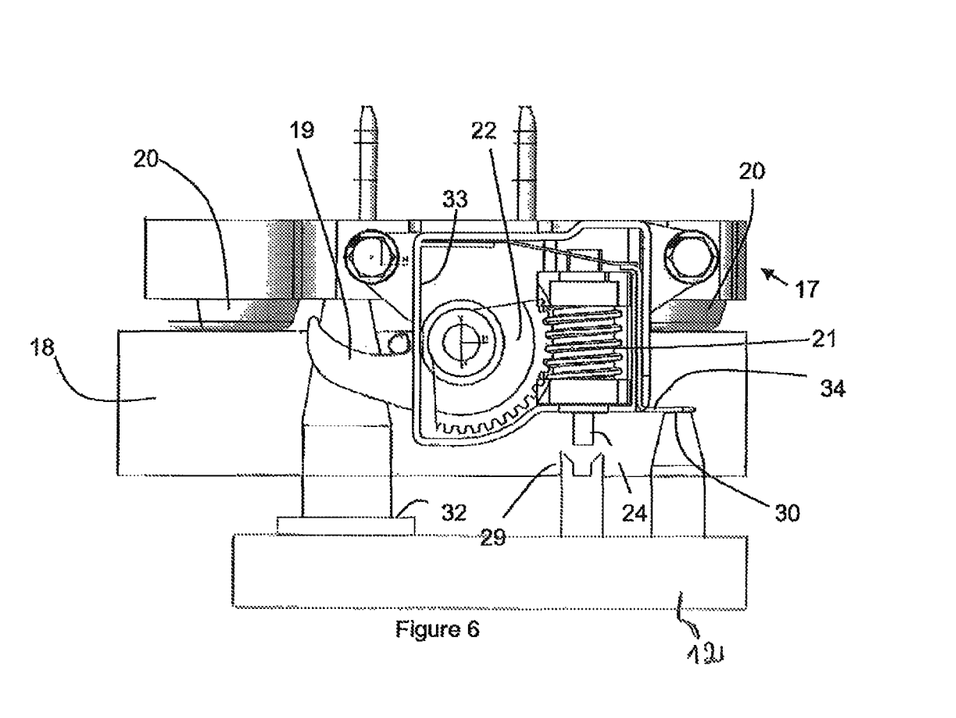

With reference to FIGS. 3 to 6 in particular, each lock 17 comprises a hook 19 configured to draw the object in the direction of the structure by progressively compressing a resiliently deformable means 20 inserted between the object and the structure and to support the object relative to the structure at the end of the drawing travel. FIGS. 5 and 6 respectively show the device before and after the drawing travel of the object by the combined action of the plurality of hooks 19. It should be noted that the deformation of the resiliently deformable means can be implemented over all or part of the drawing travel.

The hook 19 has dimensions and a shape allowing it ultimately to be configured so as to:
- vary between a locking configuration supporting the object under the structure (FIG. 6) and an unlocking configuration releasing the object relative to the structure (FIG. 5),
- and exert a drawing force of the object relative to the structure when passing into the locking configuration so as to implement said drawing over the drawing travel, the drawing force progressively deforming the resiliently deformable means over all or part of the drawing travel and the resiliently deformable means exerting a return force equal to and opposite the drawing force.

The hook 19 is designed in particular such that, in the locking configuration, it forms an angle with respect to the axis Z so as to allow a recovery of forces opposite both the weight of the object and the return forces of the resiliently deformable means, which then adopts a state deformed under the action of the object in turn urged by the plurality of hooks 19, toward the undeformed state of said means. The hook 19 also prevents, up to a certain level of force, any movement of the battery with respect to the axes X and Y, in particular preventing displacements of weak amplitude. On the other hand, the shape of the hook 19 allows it to cooperate with hooking elements 23 secured to the object (for example at least one ring or equivalent secured to the battery support 18) so as to transmit to said hooking elements the drawing force under the sole action of displacement of the hook 19 toward the locking configuration thereof by driving by means of the transmission device. In particular, the arrangement of the hooking elements 23 secured to the object and the arrangement of the hook 19 are such that the simple displacement of the hook 19 in the direction of the locking configuration thereof allows an automatic engagement of the hooking elements 23 by the hook 19 then the application of the drawing force of the hook 19 to the object at the hooking elements 23. Each lock 17 then cooperates with these hooking elements 23 configured so as to cooperate with the hook 19 of the lock 17 so as to permit on the one hand the application, by the hook 19, to the hooking elements 23 of the drawing force of the object in the direction of the structure and on the other hand the support of the object by the hook 19 at the end of the drawing travel.

The expression "resiliently deformable means" means any means deforming resiliently under the effect of a force, in particular oriented vertically in accordance with Z and directed upwardly. The locking and/or unlocking system thus comprises this resiliently deformable means arranged at the object-structure interface and intended to exert a return force distancing the object relative to the structure in a direction opposite the drawing force applied by the plurality of hooks 19. For example, the resiliently deformable means may comprise one or more pads 20 made of elastomer material, secured to the lock 17. Nevertheless, any resiliently deformable means may be suitable, in particular one or more spring(s). Although in the illustrated variant the different resiliently deformable means integrated in the system are secured to the locks 17 and therefore the structure, it is clear that the resiliently deformable means may be secured to the object alternatively or in combination, for example at the battery support 18 and/or the battery 10 itself. The resiliently deformable means make it possible to apply, thanks to the distancing return forces that they apply to the object, a global prestress force between the structure and the object so as to immobilize said components relative to one another in translation along the axes X and Y thanks to friction at the object-structure interface when the hooks 19 of the set of locks 17 are at the end of the drawing travel.

On the other hand, each lock 17 comprises a transmission device driving the hook 19 over the drawing travel thereof. The transmission device is advantageously configured so as to be actuated by one of the actuation tools 12. In particular, a number of actuation tools 12 equal to the number of locks 17 will be provided, each of the tools 12 making it possible to actuate the transmission device of one of the locks 17. More specifically, each actuation tool 12 is configured to actuate the transmission device of a given lock 17 of the system so as to drive the hook 19 thereof so as to:
  draw the object in the direction of the structure by compressing the resiliently deformable means,
  support the object relative to the structure at the end of the drawing travel,
  allow solely, by synchronization of the actuation tools 12, a movement in translation of the object along the vertical axis Z, that is to say with no movement of rotation about said axis Z.

In a particularly advantageous variant, due to its simplicity and efficacy, the transmission device comprised by each lock 17 for driving the hook 19 from the unlocking configuration (FIG. 5) into the locking configuration (FIG. 6), or vice versa, comprises a worm screw 21 and a pinion 22 engaged with the worm screw 21. The hook 19 is advantageously formed in one piece with the pinion 22, in the sense that the hook 19 and the pinion 22 are a single unit, formed in one piece. The setting in rotation of the worm screw 21 in the direction of screwing sets in rotation the pinion 22 upwardly about a horizontal pivot axis denoted by 35. The hook 19, by the pivoting of the pinion 22, is displaced upwardly. The setting in rotation of the worm screw 21 in a reverse direction drives the hook 19 downwardly in an opposite pivot direction of the pinion 22.

The transmission device can be designed so as to immobilize the hook 19 in the locking configuration thereof by opposing the effect on the hook 19 of the application of the weight of the supported object and the return forces of the resiliently deformable means. For this, the transmission device has a non-reversible functioning, in this sense that movement can be transmitted only from the worm screw 21 to the pinion 22, the forces applied by the pinion 22 due to the weight of the supported object and the return forces of the resiliently deformable means not being sufficient under any circumstance to drive the worm screw 21 in rotation. The transmission device thus ensures a positive blocking of the hook 19 in the locking configuration thereof.

To allow the actuation of the lock 17 by means of a given tool 12 advantageously separate from the structure and the object (limiting the complexity, the weight and the cost of the elements still installed onboard the structure), the worm screw 21 comprises a head 24 accessible from a side opposite the structure, under the lock 17, by screwing and/or unscrewing elements 16 belonging to the actuation tool 12. This may advantageously be a standard drill.

More generally, in addition to the elements 16 for screwing and/or unscrewing the worm screw 21 belonging to the transmission device of the lock 17, each actuation tool 12 comprises elements selected from the following:
  bearing elements 15 intended to cooperate by contact with bearing elements 25 secured to the lock 17 (and/or the structure) in order to level and possibly lift the structure in accordance with Z to an exchange height,
  elements 30 for unblocking a security mechanism (described further below) of the lock 17,
  elements 13, 14 for aligning the actuation tool 12 with respect to the object along the longitudinal axis X and the transverse axis Y of the structure.

The locking and/or unlocking system advantageously comprises at least three locks 17, each lock 17 comprising bearing elements 25 intended to cooperate by contact with the bearing elements 15 belonging to the actuation tool 12 so as to level the structure about the longitudinal axis X of the structure and/or about the transverse axis Y of the structure and possibly to lift the structure in accordance with the vertical axis Z of the structure to an independent height of the structure. The arrangement of at least three locks 17, each equipped with bearing elements 25 enabling the leveling by a cooperation by bearing with elements 15 secured to the tools 12, enables a simple and effective leveling directly at the actuation tools 12, the actuation of the hooks 19 consequently being very simple and advantageously independent of the structure by tools 12 that are separate from the structure and the object.

The term "leveling" means a procedure consisting of applying mechanical forces to the structure making it possible to orientate the structure in a given spatial orientation (included or not) relative to the plane (X, Y), this given orientation also being independent of the type of structure and the possible load conditions of the vehicle.

In an embodiment having the advantage of simplicity and efficacy, the alignment elements 13, 14 secured to the tool 12 are configured so as to cooperate by introduction or insertion with centering elements 26, 27 provided on the object, that is to say the alignment elements 13, 14 are inserted into the centering elements 26, 27 and/or the centering elements 26, 27 are inserted into the alignment elements 13, 14. In the specific variant illustrated, the two alignment elements 13, 14 of each of the tools 12 are formed by at least partially conical drivers for self-centering. These two drivers can be inserted into two holes (or ears or apertures or equivalent) respectively constituting centering elements 26, 27, formed in the battery support 18 secured to the battery 10. In other words, the holes enabling the centering of the drivers (by cooperation by introduction) are secured to the object. The arrangement of at least two drivers on each of the tools 12 also makes it possible to block the rotation in accordance with Z of the object relative to the tool 12 in a situation of cooperation by introduction.

In addition, the battery support 18 can be provided with a supplementary hole 29 for the passage of the screwing/unscrewing elements 16 through the object to be mounted on the structure in order to give access to the head 24 of the lock 17 to be actuated.

Advantageously and for simplicity, the bearing elements 15 and/or the unblocking elements 30 are formed by an upper end (in accordance with Z) of at least one of the alignment elements 13, 14. In the illustrated variant, the bearing elements 15 are formed by the upper end of the alignment element 13, whereas the unblocking elements 30, designed for example in order to act by a vertical thrust, are formed by the upper end of the alignment element 14.

As indicated above, each lock 17 comprises a security mechanism varying between a blocking configuration in which the passage of the lock 17 from one configuration to the other is inhibited and an unblocking configuration in which the passage of the lock 17 from one configuration to the other is permitted. In particular, the security mechanism comprises blocking elements 31 configured so as to prevent an accidental rotation of the worm screw 21 in the blocking configuration of the mechanism.

For the implementation of the tools 12 involving a displacement along Z (this displacement being necessary at least for the alignment procedure, for the leveling procedure and possibly for the lifting procedure), the mounting/dismounting device, which comprises the plurality of such tools 12, also comprises lift elements on which the tools 12 are mounted.

The nature of the unblocking elements 30 depends on the nature of the security mechanism, in particular on the nature of the blocking elements 31. For example, as illustrated in FIGS. 3 to 6, the blocking element 31 comprises a flexible blade arranged at the upper end of the worm screw 21 opposite the lower end equipped with the head 24. This blade, which is advantageously flexible, is fixed at one end to a casing 33 enclosing the security mechanism, the worm screw 21 and the pinion 22. The opposite end of the blade can be pushed upward, by resiliently deforming the blade, by an upper end of a security latch 34 displaceable in translation from top to bottom and of which the lower end comes outside the casing 33 so as to also be displaced under the action of the thrust applied by the unblocking element 30. Only the lower end of the latch 34, the hook 19 and the head 24 of the worm screw 21 protrude outside the casing 33. The operating principle is as follows: when no thrust action is applied by the unblocking element 30 to the latch 34, the blade occupies the natural configuration thereof in which it is engaged with a complementary element arranged at the upper end of the worm screw 21, this cooperation between the blade and this element ensuring that any rotation of the worm screw 21 is blocked. The security mechanism then adopts the blocking configuration thereof. At the moment at which the unblocking element 30 of the tool 12 ensures a thrust upward on the latch 34, said latch displaces upwardly, deforming the blade, which then releases the element arranged at the upper end of the worm screw 21. The worm screw can then be set in rotation by a screwing or unscrewing action applied by the screwing and/or unscrewing element 16 at the head 24. The security mechanism then adopts the unblocking configuration. The return to a blocking configuration can be achieved as a result of the release of the latch 34 by the unblocking elements 30 and the resilient return of the blade in the situation of cooperation thereof with the worm screw 21.

In a specific embodiment, the unblocking elements 30 are configured such that the contacting of the bearing elements 15 against the underneath of the structure during the leveling of the structure relative to the plane (X, Y) and possibly during the lifting of said structure along the direction Z, automatically drives the actuation, by the unblocking elements 30, of the security mechanism toward the unblocking configuration thereof in the manner described above at the latch 34. In other words, it is solely the action of the lift elements associated with the tools 12 that causes the switch to the unblocking configuration of the security mechanism at the moment at which the tools 12 bear against the structure.

The bearing elements 15 are preferably configured so as to come into contact, during the leveling of the structure and possibly lifting thereof, not with the structure but with the lock 17 (or possibly with a lock support inserted between the lock 17 and the structure in order to connect a given lock 17 to the structure, i.e., to the vehicle chassis 11). The underneath of the structure against which the bearing elements 15 bear at the moment of the leveling of the structure and possibly the lifting thereof is formed in practice by a lower face of the lock 17 (or a lower face of the lock support). Such features make it possible to render the solution independent of the type of structure, thus making the solution easily standardizable.

In order to be able to support the battery 10 after release thereof by the locks 17, each tool 12 further comprises a support element 32 intended to support the object (battery 10) after release thereof by the locks 17 relative to the structure (chassis 11). In the illustrated variant, the support element 32 is formed simply by a shoulder provided on the driver forming the alignment element 13.

The device for mounting and/or dismounting the object under the battery functions as follows:

When it is desired to mount an object under the structure, it is necessary in a first step to provide the object and the structure by inserting therebetween the resiliently deformable means. Then, the transmission devices of the set of locks 17 are actuated by just as many actuation tools 12 which are separate from the structure and the object, so as to drive the hooks 19 of the locks 17 in order to draw the object in the direction of the structure by compressing the resiliently deformable means, then support the object relative to the structure at the end of the driving travel.

By contrast, when it is desired to dismount an object from the underneath of a structure, a resiliently deformable means being inserted between the object and the structure in a compressed state, the transmission devices of the set of locks 17 are actuated by just as many actuation tools 12 that are separate from the structure and the object, so as to drive the hooks 19 of the locks 17 in order to release the object relative to the structure and to distance the object in a direction opposite the structure by releasing the resiliently deformable means from the compressed state thereof.

The solution described above also presents the following advantages:

- the mounting and/or dismounting device integrates the centering and bearing functions for the leveling of the vehicle necessary for the success of the locking of the battery as well as the function of irreversibility of the locking (security mechanism and unblocking element 30),
- there is no need to create a leveling reference point on the vehicle other than the bearing point of the bearing element 15, thus resulting in a simplification of the design,
- the reliability is good due to the low number of used actuators,
- the solution avoids managing an excessively large travel in the gap between the battery 10 and the body during the locking, which results in a simpler design of the joint (less amplitude of compression),
- the solution ensures a stable berthing movement of the leveling connectors and joints without additional means;
- the solution allows a gain of 50% with regard to the battery exchange time compared with existing solutions,
- the centering function via the drill holes in the battery supports 18 also integrates the function of reference points at two points, enabling simplified handling and holding of the battery during transfers thereof.

The invention claimed is:

1. A system for locking and unlocking an object of an electric or hybrid motor vehicle under a structure of the vehicle, the system comprising:
    a plurality of locks configured to fix the object under the structure, the locks being secured to the structure and each of the locks comprising
        a hook configured to draw the object during a drawing travel in a direction of the structure by compressing a resiliently deformable means inserted between the object and the structure and to support the object relative to the structure at an end of the drawing travel, and
        a transmission device configured to drive the hook during the drawing travel of the object to the structure and
    an actuation tool that is separate from the structure and the object, the actuation tool comprising:
        an actuation element that extends out from a first face of the actuation tool to actuate the transmission device to drive the hook of a corresponding lock of the plurality of locks, and
        an alignment element that cooperates with a bearing element on the lock.

2. The system as claimed in claim 1, wherein the hook is configured to vary between a locking configuration that supports the object under the structure and an unlocking configuration that releases the object relative to the structure, and the hook is configured to exert a drawing force of the object relative to the structure when passing into the locking configuration so as to implement said drawing over the drawing travel, the drawing force progressively deforming the resiliently deformable means over all or part of the drawing travel and the resiliently deformable means exerting a return force equal to and opposite the drawing force.

3. The system as claimed in claim 2, wherein each lock comprises a security mechanism varying between a blocking configuration in which passing of the lock from the locking configuration to the unlocking configuration is inhibited and an unblocking configuration in which the passing of the lock from the locking configuration to the unlocking configuration is permitted.

4. The system as claimed in claim 3, wherein the transmission device comprises a worm screw and a pinion engaged with the worm screw, the hook being formed integrally with the pinion.

5. The system as claimed in claim 4, wherein the worm screw comprises a head accessible from a side opposite the structure, under the lock, by the actuation element.

6. The system as claimed in claim 4, wherein the security mechanism comprises blocking elements configured so as to prevent an accidental rotation of the worm screw.

7. The system as claimed in claim 3, wherein the actuation tool further comprises:
    an element configured to unblock the security mechanism of the lock.

8. The system as claimed in claim 2, wherein each lock cooperates with hooking elements secured to the object and configured to cooperate with the hook of the lock in a manner such that the hook applies the drawing force on the hooking elements in the direction of the structure and the support of the object by the hook at the end of the drawing travel.

9. The system as claimed in claim 8, wherein the hooking elements secured to the object is a battery support secured to a drive battery of the vehicle.

10. The system as claimed in claim 1, wherein the system further comprises at least three locks, each lock comprising bearing elements to cooperate by contact with bearing elements belonging to the actuation tool so as to level the structure about a longitudinal axis of the structure or about a transverse axis of the structure and to lift the structure along a vertical axis of the structure to an independent height of the structure.

11. The system as claimed in claim 1, wherein the object is a power battery of a drive engine of the electric or hybrid motor vehicle and the structure is a chassis of the vehicle.

12. The system as claimed in claim 1, wherein an end of the alignment element that cooperates with the bearing element on the lock has a conical shape.

13. A method for mounting or dismounting an object of an electric or hybrid motor vehicle under a structure of the vehicle, comprising:
    fixing an object under a structure via a locking and unlocking system comprising a plurality of locks of the object under the structure, the locks being secured to the structure and each of the locks comprising a hook, a resiliently deformable means inserted between the object and the structure, and a transmission device,
    wherein the fixing comprises actuating a plurality of actuation tools that are separate from the structure and the object such that each actuation tool includes an actuation element that extends out from a first face of the actuation tool through an opening in the object and actuates the transmission device of a given lock of the system to drive the hook thereof to draw the object during a drawing travel in a direction of the structure by compressing the resiliently deformable means inserted between the object and the structure and then supporting the object relative to the structure at an end of the drawing travel.

14. The method as claimed in claim 13, wherein each of the plurality of actuation tools includes an alignment element that extends out from the first face of the actuation tool to cooperate with a bearing element on the lock.

\* \* \* \* \*

UNITED STATES PATENT AND TRADEMARK OFFICE
CERTIFICATE OF CORRECTION

PATENT NO. : 9,662,965 B2  
APPLICATION NO. : 14/385309  
DATED : May 30, 2017  
INVENTOR(S) : Jacques Poillot et al.

Page 1 of 1

It is certified that error appears in the above-identified patent and that said Letters Patent is hereby corrected as shown below:

On the Title Page

Item (73) the Assignee's information is incorrect. Item (73) should read:  
--(73) Assignee: RENAULT s.a.s., Boulogne-billancourt (FR)--

Signed and Sealed this  
Second Day of January, 2018

Joseph Matal  
*Performing the Functions and Duties of the*  
*Under Secretary of Commerce for Intellectual Property and*  
*Director of the United States Patent and Trademark Office*